United States Patent

Hahn et al.

[11] Patent Number: 6,010,297
[45] Date of Patent: Jan. 4, 2000

[54] VEHICLE RESTRAINT AND IMPROVEMENTS

[75] Inventors: Norbert Hahn, Franklin; Mark G. Petri, Mequon; Scott L. Springer, Whitewater, all of Wis.

[73] Assignee: Rite-Hite Holding Corporation, Milwaukee, Wis.

[21] Appl. No.: 08/697,937

[22] Filed: Sep. 3, 1996

[51] Int. Cl.[7] .................................................. B65G 69/00
[52] U.S. Cl. ............................................................ 414/401
[58] Field of Search .................................. 414/396, 401, 414/402, 584

[56] References Cited

U.S. PATENT DOCUMENTS

| | | | |
|---|---|---|---|
| 4,264,259 | 4/1981 | Hipp | 414/401 |
| 4,282,621 | 8/1981 | Anthony et al. | 414/584 X |
| 4,373,847 | 2/1983 | Hipp et al. | 414/401 |
| 4,443,150 | 4/1984 | Hahn et al. | 414/401 |
| 4,488,325 | 12/1984 | Bennett et al. | 414/401 |
| 4,553,895 | 11/1985 | Ellis | 414/401 |
| 4,589,813 | 5/1986 | Hagen et al. | 414/401 |
| 4,605,353 | 8/1986 | Hahn et al. | 414/401 |
| 4,630,989 | 12/1986 | Davey | 414/401 |
| 4,634,334 | 1/1987 | Hahn et al. | 414/401 |
| 4,648,781 | 3/1987 | Sikora | 414/584 X |
| 4,664,582 | 5/1987 | Edmeads | 414/401 |
| 4,674,941 | 6/1987 | Hageman | 414/401 |
| 4,695,216 | 9/1987 | Erlandsson | 414/401 |
| 4,728,242 | 3/1988 | Erlandsson | 414/401 |
| 4,735,542 | 4/1988 | Fisher | 414/401 |
| 4,759,678 | 7/1988 | Hageman | 414/401 |
| 4,767,254 | 8/1988 | Kovach et al. | 414/401 |
| 4,784,567 | 11/1988 | Hageman et al. | 414/401 |
| 4,815,918 | 3/1989 | Bennett et al. | 414/401 |
| 4,818,170 | 4/1989 | Fisher et al. | 414/401 |
| 4,830,563 | 5/1989 | Yeakle | 414/401 |
| 4,861,217 | 8/1989 | Erlandsson | 414/401 |
| 4,865,508 | 9/1989 | Carlson | 414/401 |
| 4,887,954 | 12/1989 | Gregerson et al. | 414/401 |
| 4,915,568 | 4/1990 | West | 414/401 |
| 4,938,647 | 7/1990 | Erlandsson | 414/401 |
| 4,946,330 | 8/1990 | Pedersen | 414/401 |
| 4,963,068 | 10/1990 | Gelder | 414/401 |
| 4,973,213 | 11/1990 | Erlandsson | 414/401 |
| 4,988,254 | 1/1991 | Alexander | 414/401 |
| 5,212,846 | 5/1993 | Hahn | 414/401 |
| 5,297,921 | 3/1994 | Springer | 414/401 |
| 5,348,437 | 9/1994 | Krupke et al. | 414/401 |
| 5,388,947 | 2/1995 | Ancel | 414/401 |
| 5,454,682 | 10/1995 | Alexander | 414/401 |
| 5,683,219 | 11/1997 | Gilles, Jr. et al. | 414/401 |

OTHER PUBLICATIONS

McGuire Company 2 page flyer, "TRD–2000 Truck Restraint Device".

Nova Technology Inc. 16 page manual, "Installation Instuctions & Owner's Manual: Nova Technology Truck Lock".

*Primary Examiner*—James W. Keenan

[57] ABSTRACT

Improved vehicle restraints, restraint components and specific improvements to certain existing restraints, including: 1) improvements to the design of the barrier portion or head of the restraining member intended to prevent or eliminate downward forces exerted on the restraining member by a departing ICC bar; and 2) providing a locking member for locking the restraining member of a restraint into a given vertical position for a pull away by the parked vehicle, the lock not impeding normal operation of the restraint, but only being activated during a pull away.

37 Claims, 9 Drawing Sheets

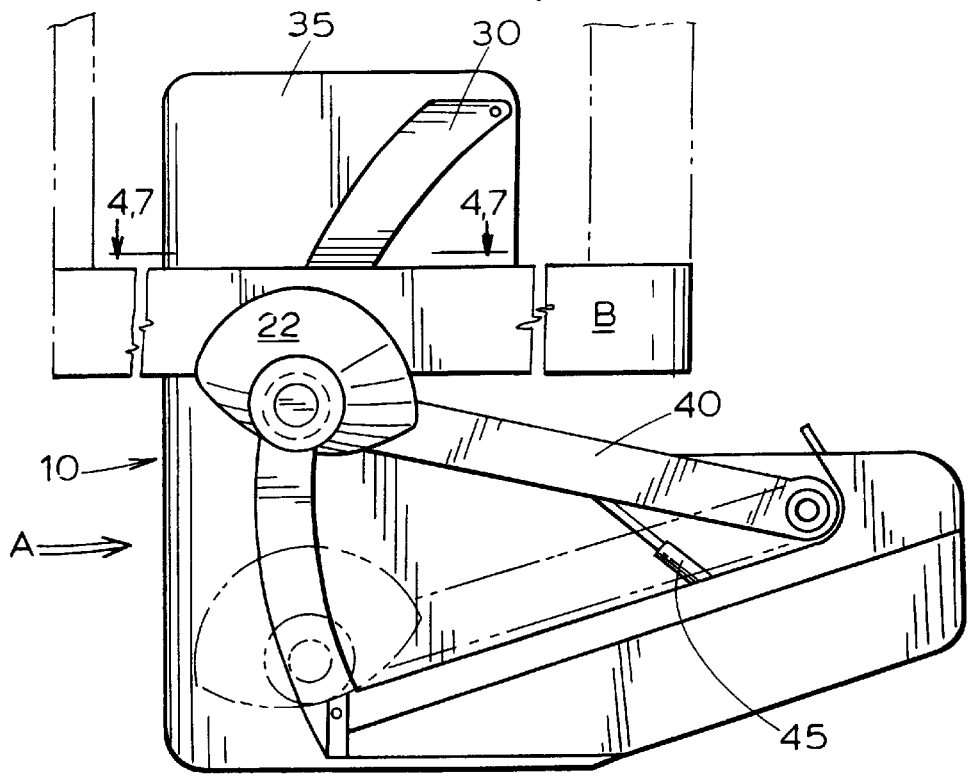
Fig. 3 (PRIOR ART)
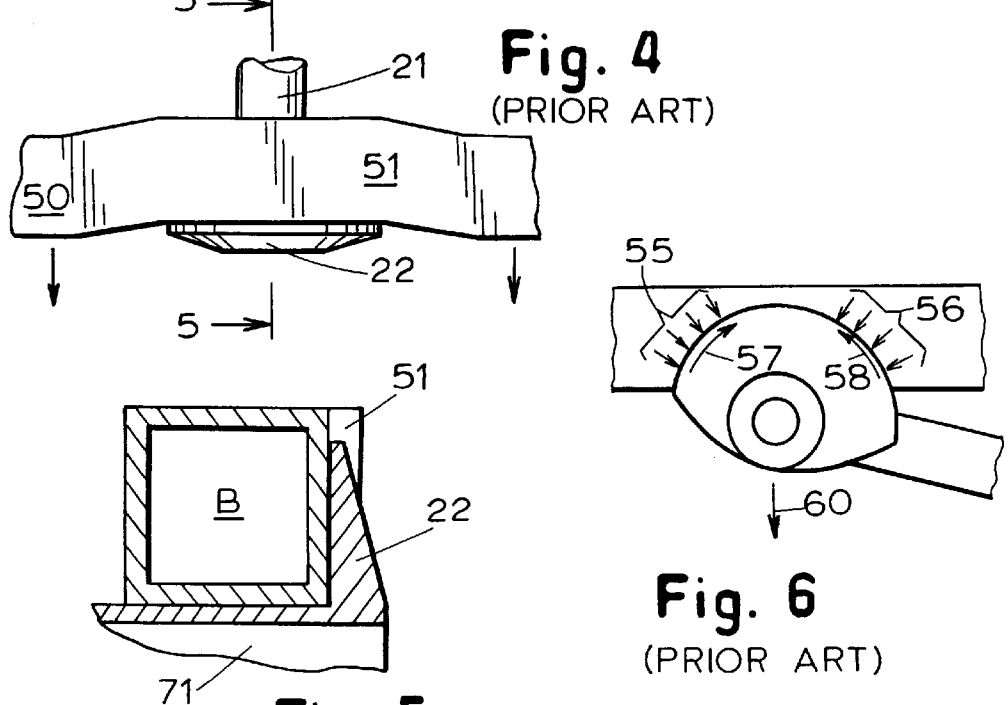
Fig. 4 (PRIOR ART)
Fig. 5 (PRIOR ART)
Fig. 6 (PRIOR ART)

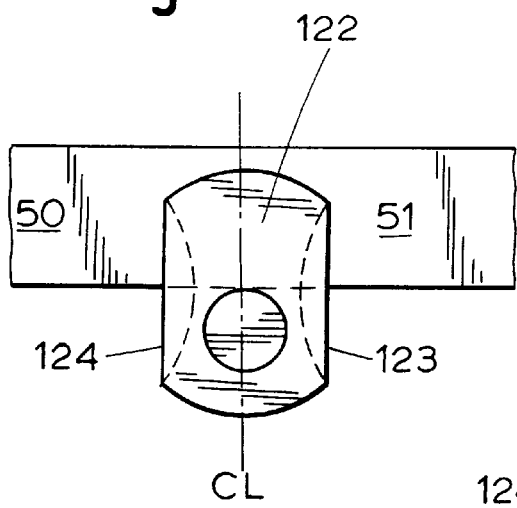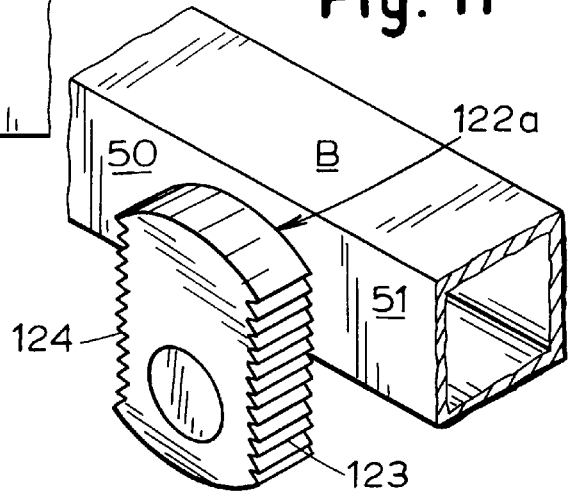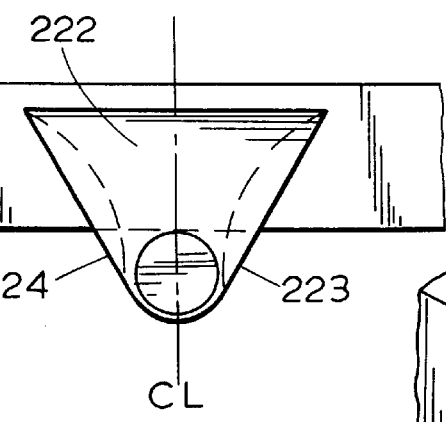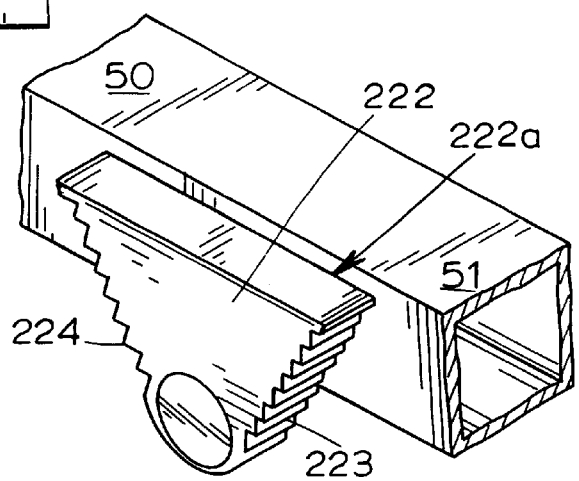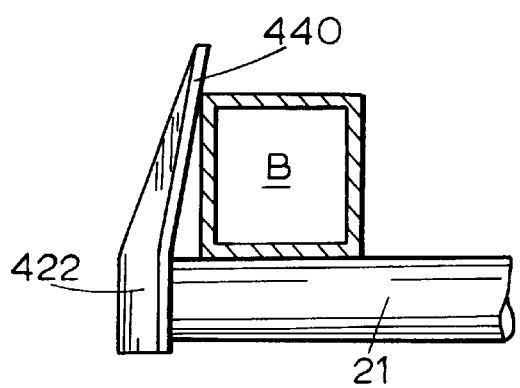

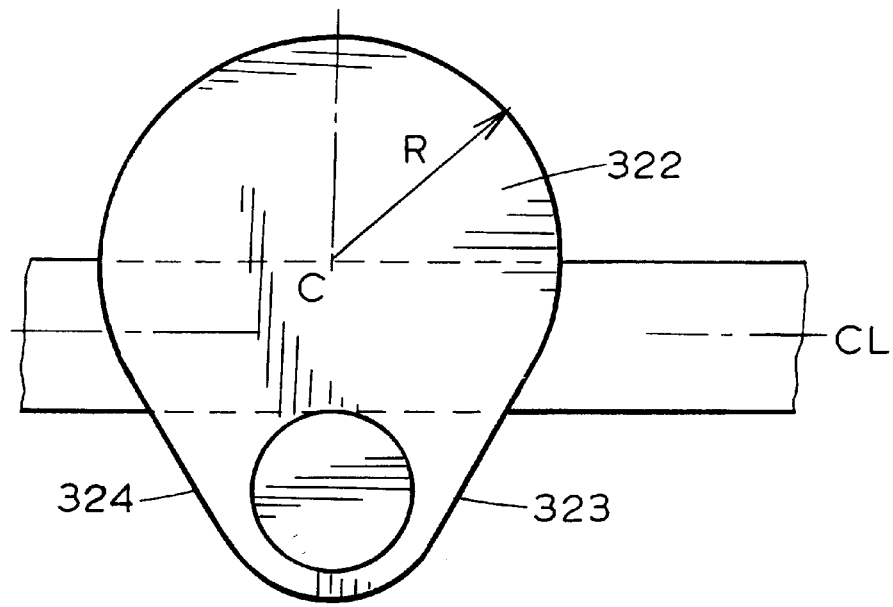
Fig. 15
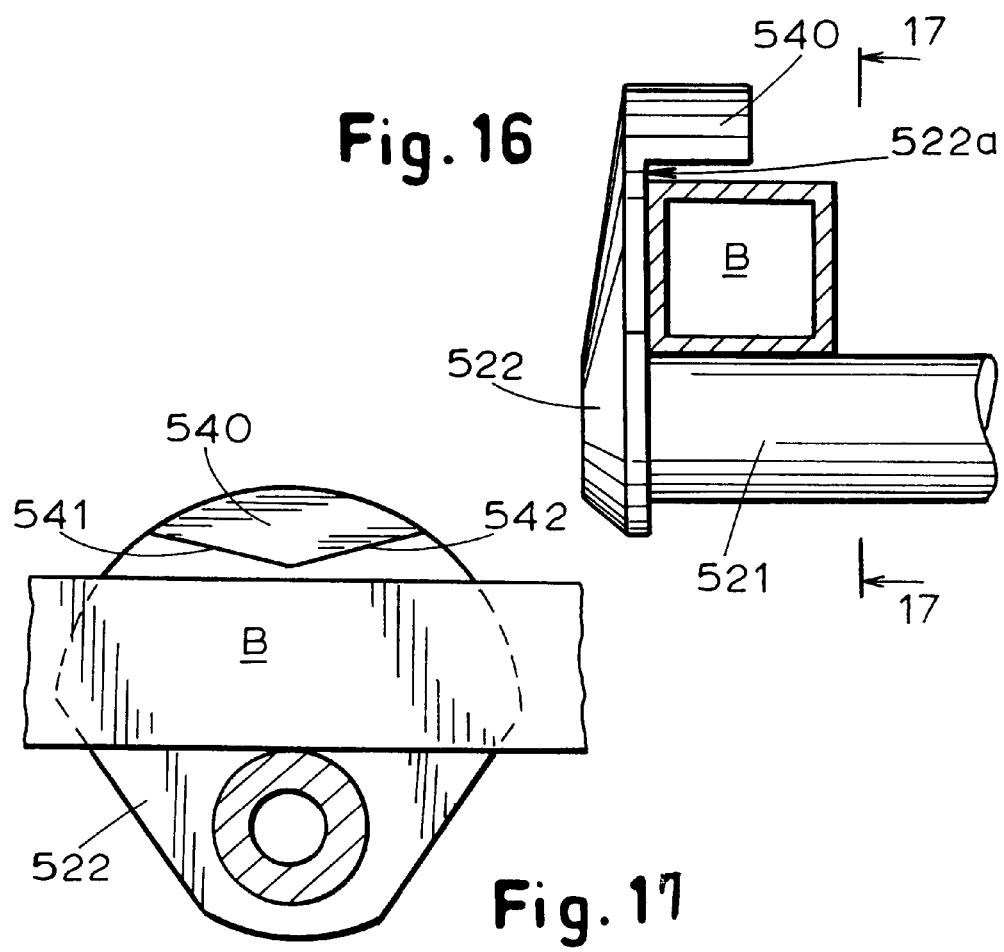
Fig. 16
Fig. 17

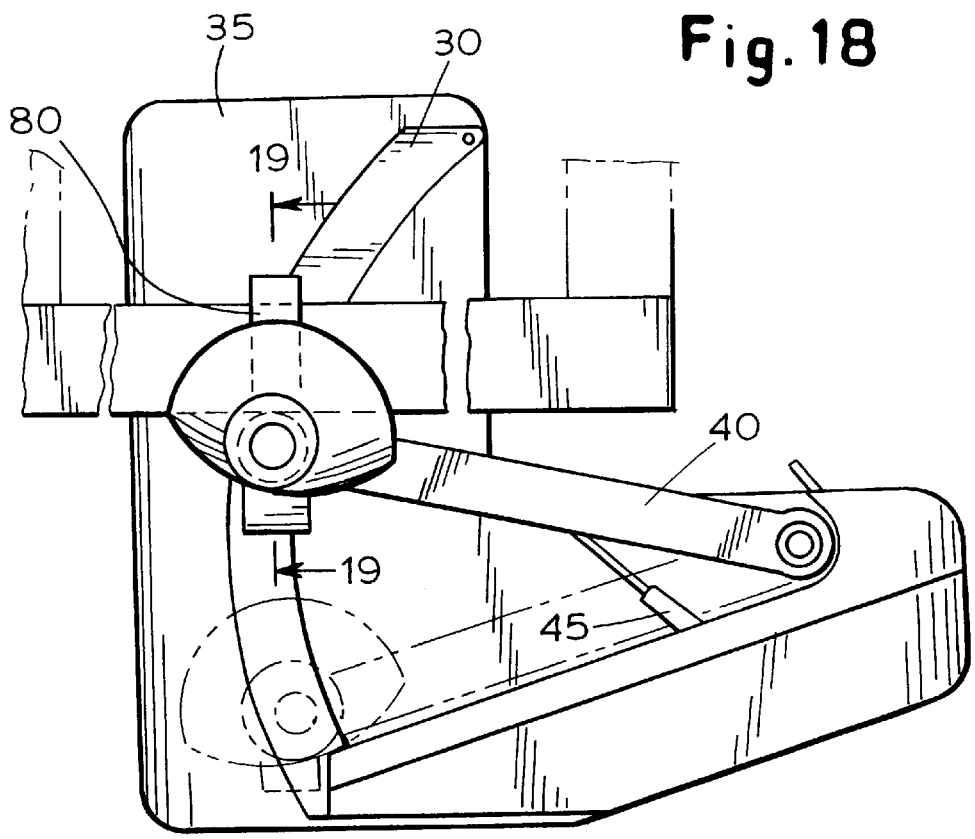
Fig. 18
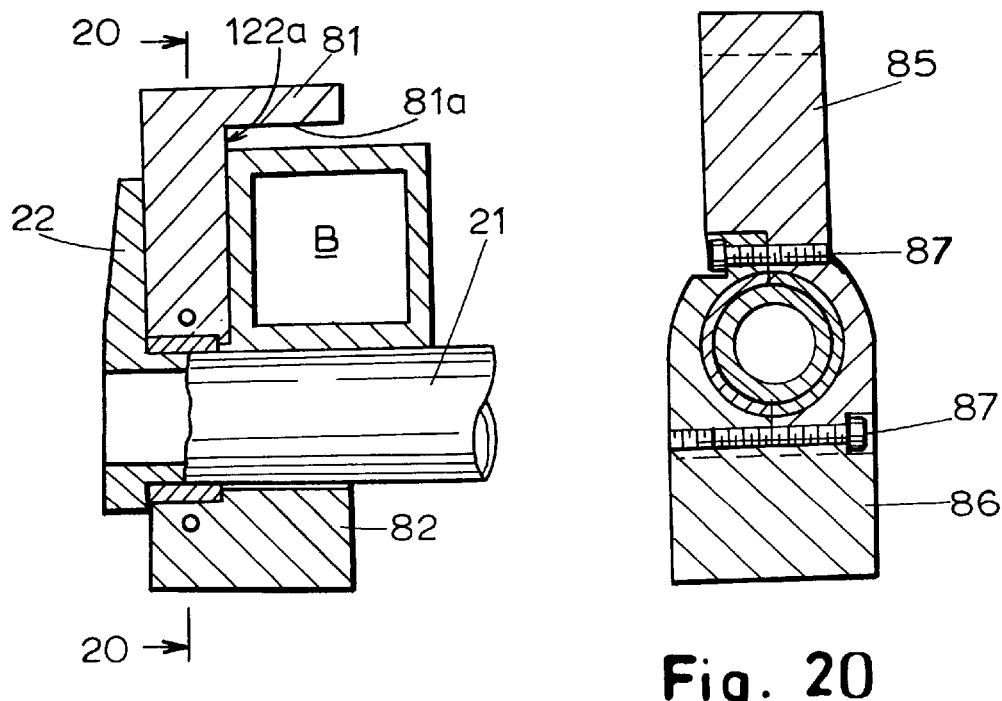
Fig. 19
Fig. 20

Fig. 25
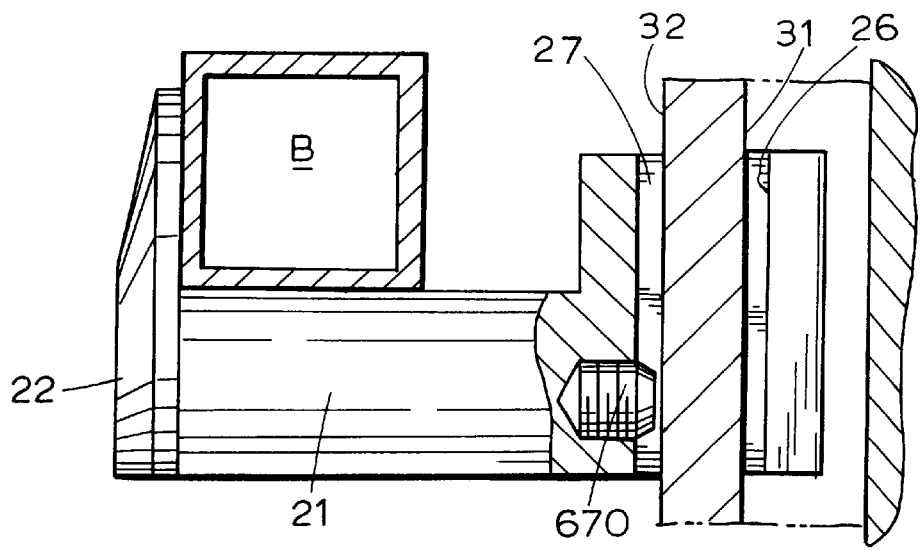
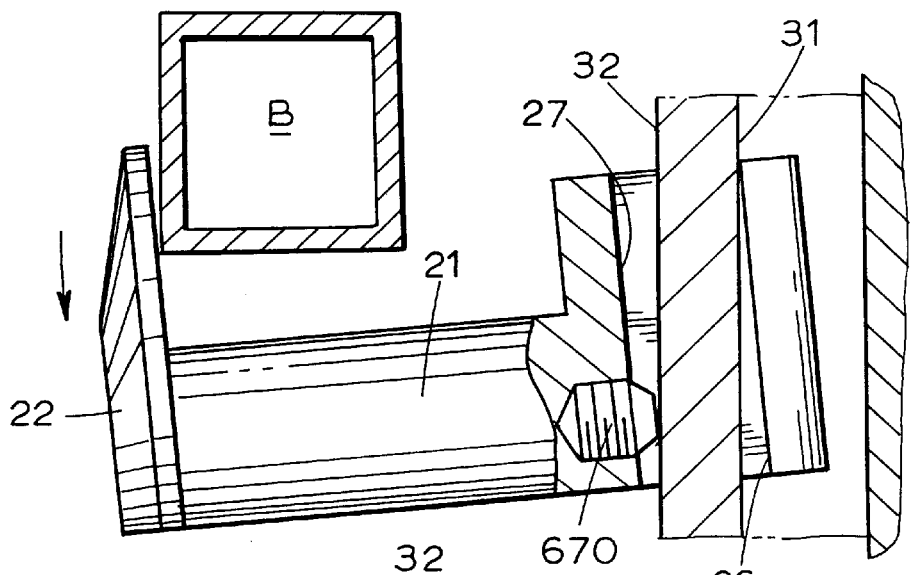
Fig. 26
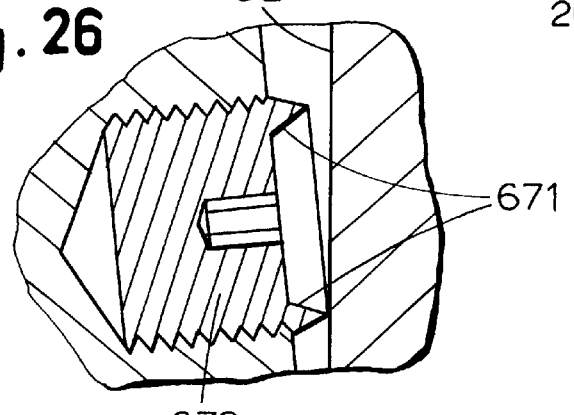
Fig. 27

VEHICLE RESTRAINT AND IMPROVEMENTS

FIELD OF THE INVENTION

The invention is directed generally to vehicle restraints, and more particularly to improving the ability for vehicle restraints to prevent vehicles from uncontrolled separation from loading docks.

BACKGROUND AND SUMMARY OF THE INVENTION

Vehicle restraints are well known in the art, and serve the vital safety function of preventing trucks and the like parked at a loading dock from separating from the dock during the loading or unloading of the vehicle. In the absence of a vehicle restraint, or if a vehicle restraint malfunctions, the vehicle may uncontrollably separate from the dock, leaving a gap between the vehicle and the dock and/or dockleveler disposed therein. As used herein "uncontrolled" separation refers to the situation where a truck separates from the dock at a time when such separation is undesired—such as when loading or unloading of the truck is occurring and/or when a vehicle restraint is engaged. For an uncontrolled separation, a fork truck operator (or other personnel or equipment) either approaching the rear of the truck or leaving the rear of the truck could fail to realize the presence of the gap with dire consequences—the worst being the fork truck falling from the loading dock or the truck to the driveway below. Indeed, several such accidents led, in part, to the innovation of the vehicle restraint itself.

While vehicle restraints fall into several general categories, the most prevalent category is ICC bar restraints. Such restraints are typically mounted on or adjacent to the dock face and include a hook or restraining member which engages the rear impact guard or "ICC bar" of the vehicle to prevent uncontrolled separation. The National Highway Transportation Safety Administration (NHTSA) recently promulgated new regulations for ICC bars, to take effect in 1998 (although truck manufacturers are already beginning to provide ICC bars that conform to the new regulations). Under these regulations, the ICC bars must be at least 4 inches in height, and meet other requirements for strength and deflection response to applied forces. For an ICC bar restraint to effectively perform the important function of preventing uncontrolled separation, it must be capable of restraining ICC bars conforming to the new standards.

One style of ICC bar restraint is that disclosed in U.S. Pat. No. 4,865,508 to Carlson, and commercially embodied in a vehicle restraint sold by the Kelley Company, Inc. of Milwaukee, Wis. under the model name "Star." A Star-style restraint is depicted in FIGS. 1–9 of the attached drawings. In conducting tests of vehicle restraints in light of the new NHTSA standards, we have determined that the present design of a Star-style restraint makes the restraint susceptible to the dangerous condition of allowing a vehicle with what appears to be a properly restrained ICC bar to pull away and separate from the loading dock under certain commonly-occurring circumstances. As will be described in greater detail in the specification to follow, we have determined that the design of a Star-style unit allows the restraining member to be forced downward by a departing ICC bar to a position where it fails to restrain the ICC bar and the vehicle can drive or otherwise move away from the loading dock.

Accordingly, an object of the present invention is to provide improvements and modifications to a Star-style unit and other similar restraints that prevent such restraint failure. Beyond that, however, it is also an object of the present invention to generally provide safer vehicle restraints that maintain engagement with a vehicle ICC bar, particularly during pull-aways. It is a further object of the invention to provide this enhanced safety to vehicle restraints without otherwise impeding the normal operation of such restraints. It should be noted that while the inventions disclosed herein may be useful in enhancing the operation of given vehicle restraints, some restraints will not require use of the invention as other features of those restraints provide the desired functionality. Further still, certain restraints may have design characteristics that prevent incorporation of the inventive concepts of this application while still allowing the restraint to practically service the varied configurations of ICC bars and trailers.

In accordance with these and other objects of the invention, there is provided improved components for vehicle restraints as well as improved restraints, which are intended to eliminate or minimize the causes of uncontrolled separation attributable to Star-style and similar units. In addition to providing improved restraint components and restraints that avoid these causes, there is also provided specific improvements to Star-style units or similar restraints, the improvements being intended to prevent or minimize the possibility for uncontrolled separation of a parked, restrained vehicle from a loading dock.

The improved restraints, restraint components and the specific improvements to the Star-style restraints fall into two general categories. In the first category, improvements to the design of the barrier portion or head of the restraining member are provided. The barrier portion or head is the portion of the restraining member behind which the ICC bar is intended to be captured. The new restraining member designs and the Star-style head improvements prevent what is believed to be the primary factors contributing to Star-style units being forced downward and out of restraining engagement by a departing ICC bar. The other broad category of restraints, restraint components and specific improvements to the Star-style restraint are directed to locking the restraining member of a restraint into a given vertical position for a pull away by the parked vehicle. The lock does not impede normal operation of the restraint, but is only activated during a pull away to prevent failure of the restraint.

The embodiments of the invention will be described herein in reference to the appended drawings, wherein:

BRIEF DESCRIPTION OF THE DRAWINGS

FIGS. 1–9 are a series of views of the prior art Kelley Star restraint, and illustrating what is believed to be the mechanisms leading to the observed failure of the Star for certain pull away conditions;

FIG. 10 is a front elevation of an improved head configuration for the prior art restraint, according to one embodiment of the invention;

FIG. 11 is a perspective view of an improved head configuration for the prior art restraint, according to an alternative embodiment of the invention;

FIG. 12 is a front elevation of an improved head configuration for the prior art restraint, according to a further alternative embodiment of the invention;

FIG. 13 is a perspective view of an improved head configuration for the prior art restraint, according to a further alternative embodiment of the invention;

FIG. 14 is a side elevation of an improved head configuration for the prior art restraint, according to a further alternative embodiment of the invention;

FIG. 15 is a front elevation of an improved head configuration for the prior art restraint, according to a further alternative embodiment of the invention;

FIG. 16 is a side elevation of an improved head configuration for the prior art restraint, according to a further alternative embodiment of the invention;

FIG. 17 is a rear elevation of the improved head configuration of FIG. 16;

FIG. 18 is a front operational elevation of the prior art restraint and including an attachable member according to an embodiment of the invention;

FIG. 19 is a section view showing the prior art restraint and attachable member of FIG. 18;

FIG. 20 is a elevation of the attachable member of FIG. 18;

FIG. 25 is a section view of the prior art restraint, and showing the improvement of a locking member according to an alternative embodiment of the invention;

FIG. 26 is a further section view, subsequent in time to the view of FIG. 25; and FIG. 27 is a close-up section of the locking member of FIG. 25.

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents as are included within the scope and spirit of the invention as defined by the appended claims.

Figure 1:
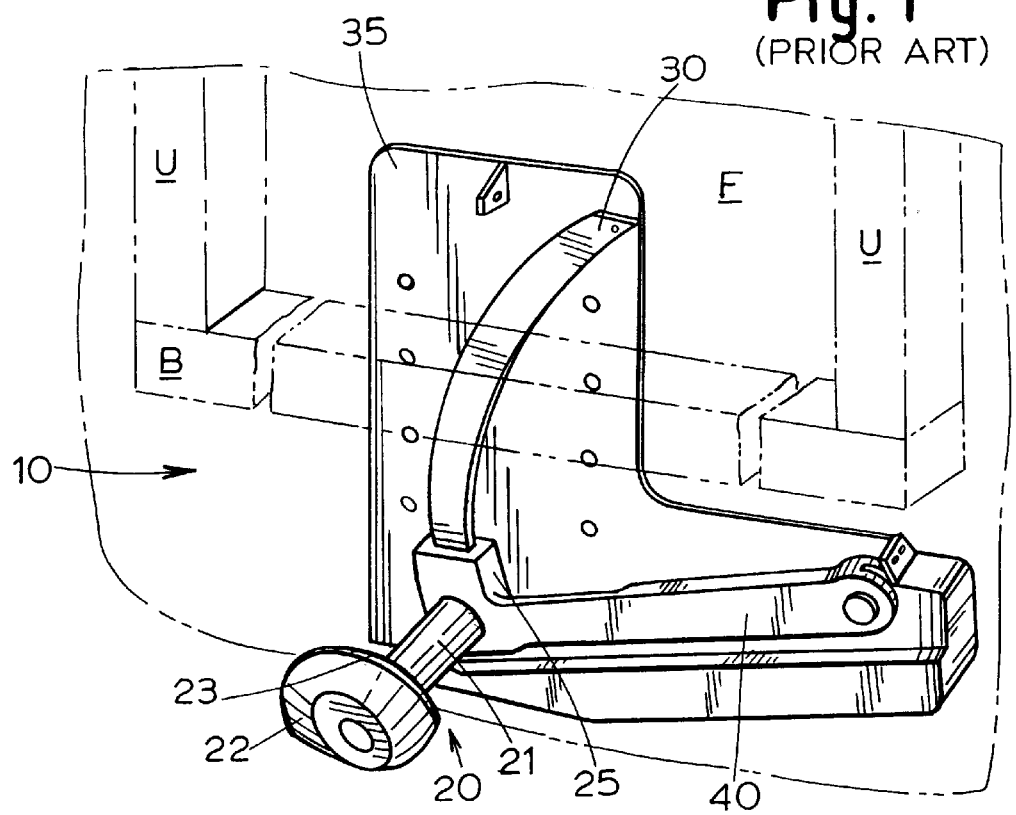

The Star-style unit that we believe to be susceptible to allowing uncontrolled separation of a restrained vehicle from a loading dock is depicted in FIGS. 1–9, which also show the mechanisms that we believe allow the uncontrolled separation. As seen in FIG. 1, the restraint 10 is adapted to be mounted adjacent (in this case on) the face F of a loading dock for selectively restraining the ICC bar (B) of a vehicle (not shown) parked at the loading dock. To restrain the bar B, the restraint 10 includes a restraining member 20 which moves substantially vertically relative to the dock face F, in this case between a lowered, stored position shown in FIG. 1 and a restraining position in FIG. 2. The restraining member includes a shank portion 21, which in the case of the Star-style restraint is a cylindrical member, and a barrier or head portion 22, which in the Star-style restraint is part circular, and includes an upper curved surface 23. To guide the restraining member 20 in its substantially vertical path relative to the dock face F, the restraining member 20 also includes a first end 25 which in this case forms a follower that engages a slightly curved track 30 mounted to a frame 35 that is in turn mounted on the dock face F. Despite the presence of the slightly curved track 30, the restraining member nonetheless moves in a substantially vertical path. As is seen most clearly in FIG. 3, the movement of the restraining member is nearly vertical between the lowered, stored position and the restraining position, with the barrier or head 22 varying only slightly from a vertical line. Further, when the movement of the restraining member is viewed from the side (depicted by the arrow "A" in FIG. 3) its motion is seen to be purely vertical.

Figure 2:
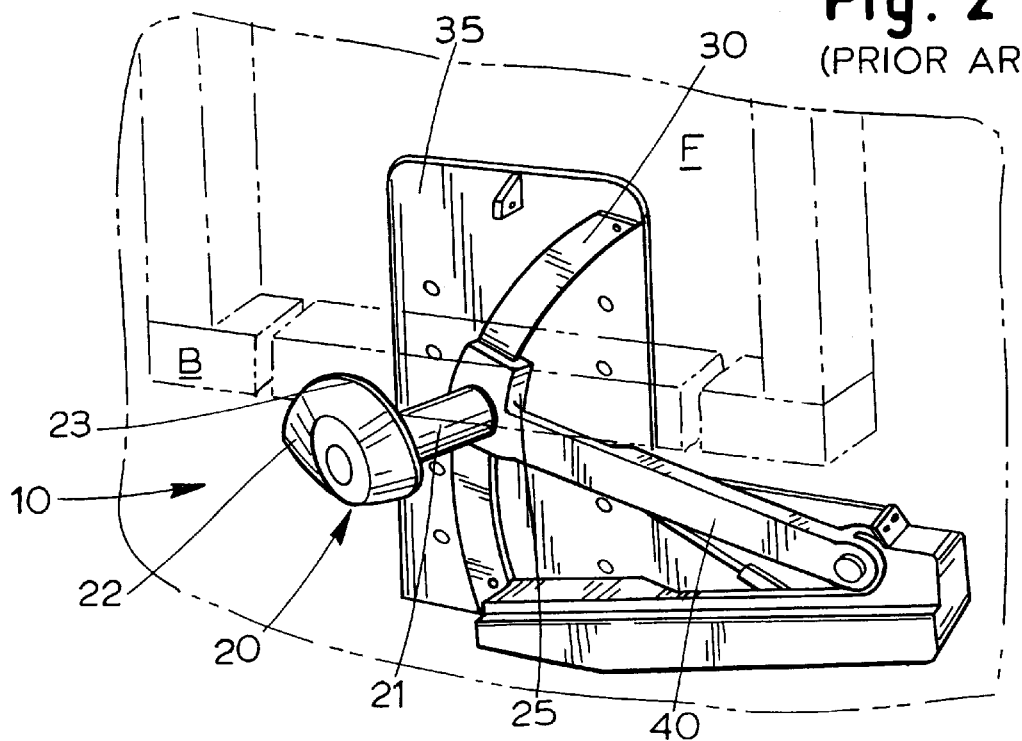

We are presently aware of two mechanisms by which the Star-style unit is moved from the lowered position of FIG. 1 to the restraining position of FIG. 2. In both versions, a gas spring powers this movement, with the restraining member being held in a lowered, stored position against the bias of the gas spring. In the manual version, manual release of a latch allows the restraining member to rise to the restraining position. The gas spring acts on an actuating arm (40 in FIGS. 1 and 2) which is connected to the restraining member to move the restraining member upwardly. A manual downward force must be applied to the restraining member to move it back to the stored position. In the powered version of the Star-style unit, a separate, hydraulic cylinder is actuated to release the actuating arm 40 from the stored position, allowing the upward bias of the gas spring 45 to move the restraining member 20 in its substantially vertical path. Reverse actuation of the hydraulic cylinder returns actuating arm 40 and the restraining member 20 to the stored position, where it is then maintained. The upward bias of the restraining member 20, provided by the gas spring, not only raises the restraining member 20, but also allows the restraining member to "float" up and down with the truck as it is loaded and unloaded (the weight variances causing the vehicle's suspension to move the vehicle up and down) to maintain the restraining member in a restraining engagement with the ICC bar B. It will thus be appreciated that as used herein the term "restraining position" is not a single position in free space of the restraining member, but rather is a range of spatial positions in which the upwardly-biased restraining member 20 is in restraining engagement with the bar B, such that the bar B is in contact with the shank 21 and is thus confined behind the barrier or head 22 to prevent the bar from moving outward away from the dock. Toward that end, the barrier or head 22 and particularly a first/inner surface 22a is disposed substantially parallel to the dock face F, as is seen most clearly in the side section of FIG. 8.

As discussed above, we have determined that the Star-type restraint is susceptible to allowing what appears to be a properly restrained ICC bar to be pulled away from the dock face by movement of the vehicle away from the dock. The mechanisms which we believe contribute to this failure are illustrated in FIGS. 4–9. As shown in the top view of FIG. 4, portions 50, 51 of the ICC bar B that are disposed laterally of the head 22 will tend to deform and "wrap around" the head 22 when the restrained bar B is in contact with first/inner surface 22a while the vehicle pulls away from the dock face. Depending on the orientation of the ICC bar when pull away occurs, one or both lateral portions 50, 51 will tend to wrap around. Both portions are shown wrapping around in FIG. 4. Of course, the ICC bar B will deform more for a greater exerted pull-out force, and less for smaller forces. Wrap around will occur at forces above some predetermined magnitude. Assuming a pull out force above that predetermined magnitude, the wrap around depicted in FIG. 4, and also seen in the section view of FIG. 5 would occur. This wrap around by the lateral portions 50, 51 of the ICC bar B causes the head 22 of the restraining member to be pinched between one or both of the two arms 50, 51, particularly in the curved upper surface 23 of the head 22. This pinching of the head 22 is depicted by the sets of small arrows 55, 56 in the front elevation view of FIG. 6. The pinching of the curved surface 23 of the head 22 causes a camming action between at least one of the lateral portions 50, 51 (and perhaps both) and the curved surface, in which the lateral portion(s) ride up and around the curved surface, as depicted by the larger arrows 57, 58 in FIG. 6. Since the ICC bar is substantially fixed in its vertical position, and is incapable of any substantial movement upward, the result of this camming action is a downward movement of the head 22 (as depicted by arrow 60) and thus the restraining member 20. As the vehicle and attached ICC bar B continue to move away from the dock, this camming action continues until the restraining member 20 is moved downward a large enough distance to allow the ICC bar to no longer be restrained. We believe this camming action to be the primary cause of the failure of the Star-style restraint for pull aways having a force above a predetermined magnitude.

Figure 7:
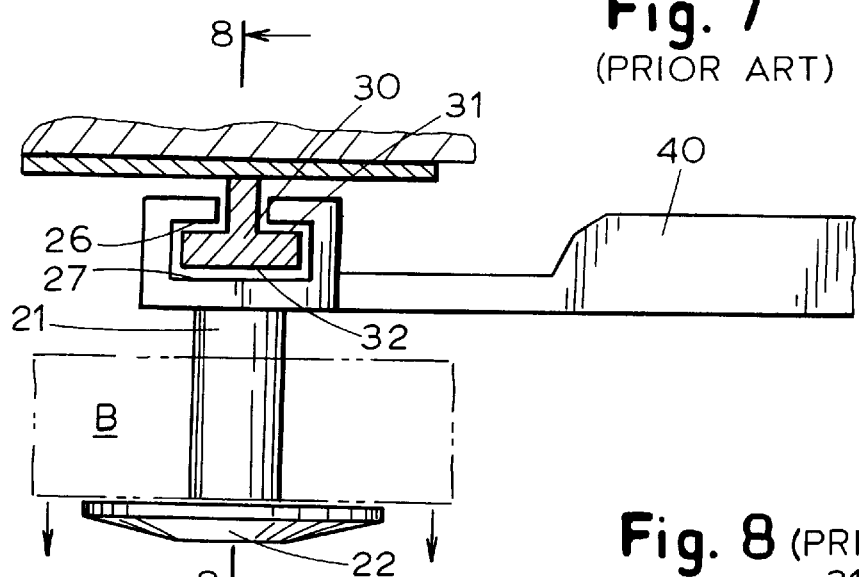
Figure 8:
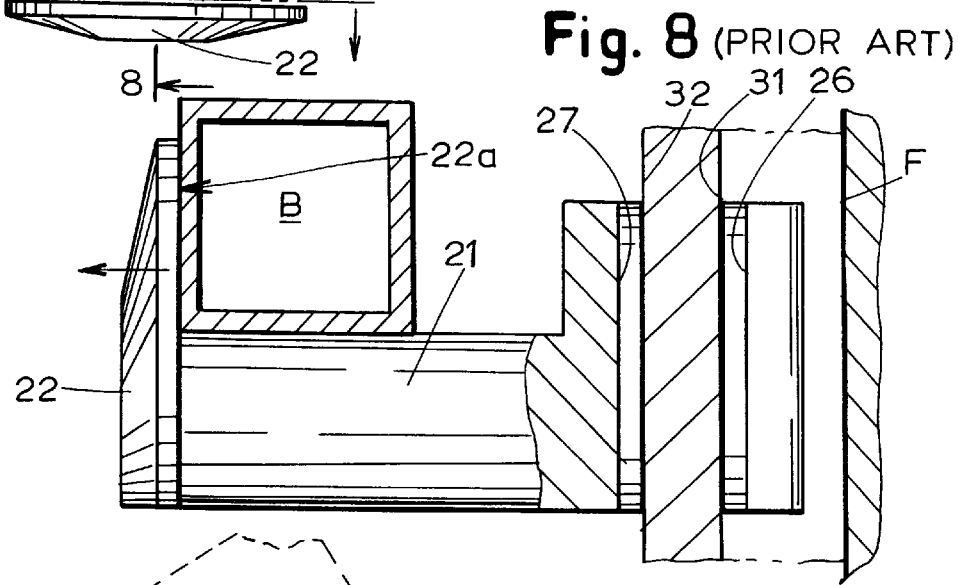
Figure 9:
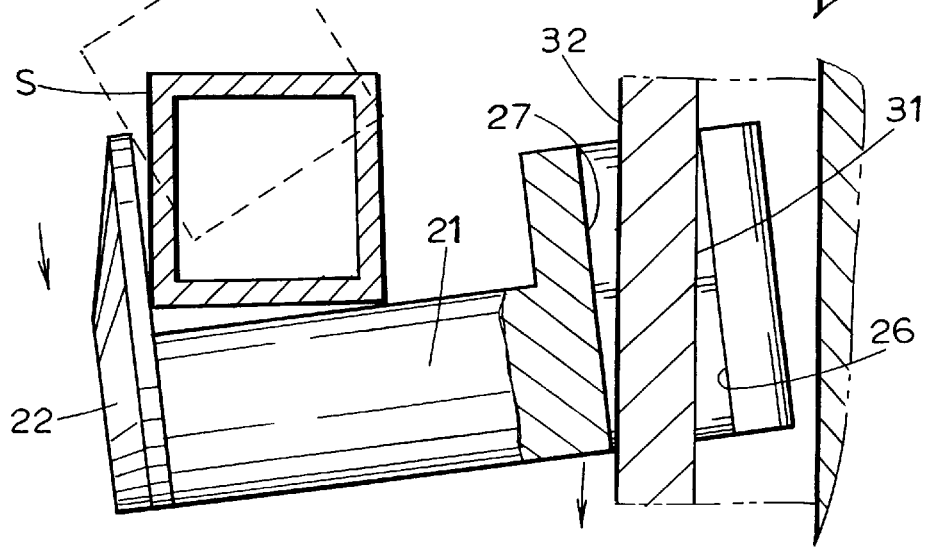
Figure 21:
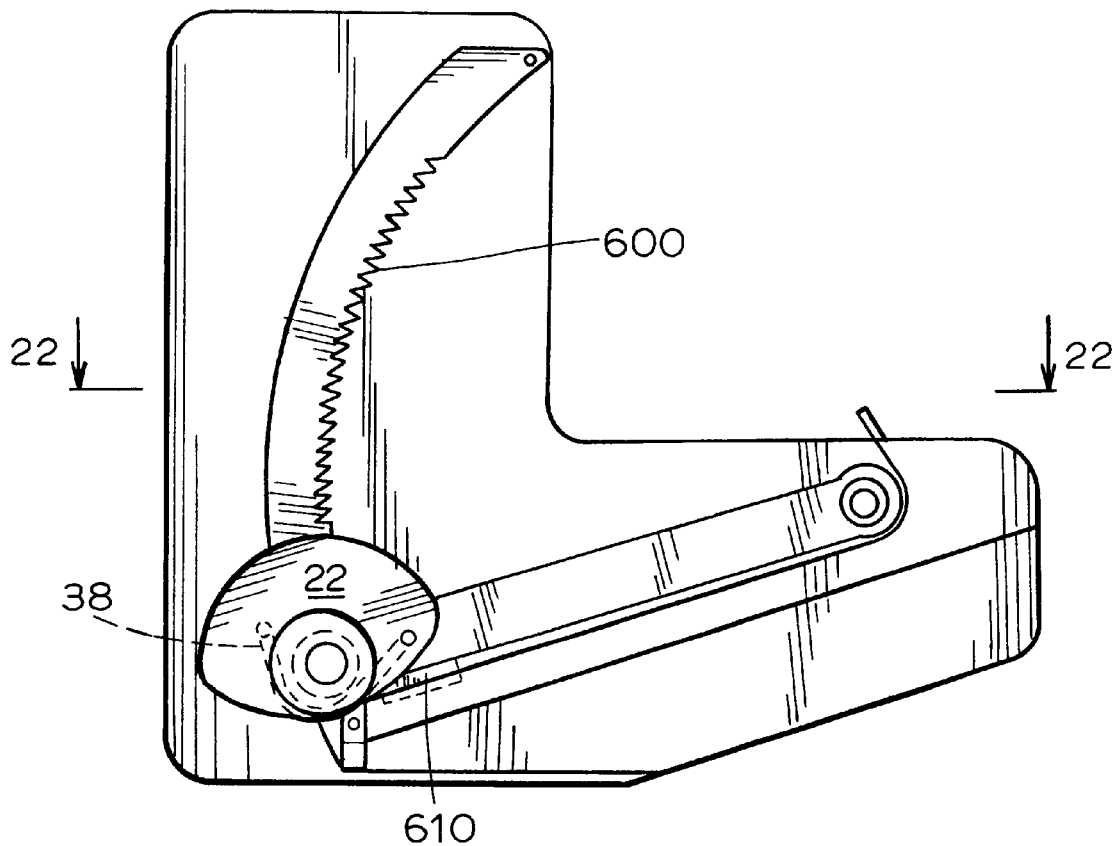
FIG. 21 is a front elevation of the prior art restraint, and showing the improvement of a locking member according to an embodiment of the invention.

A further, and we believe secondary, mechanism is depicted in the views of FIGS. 7–9. As seen in FIG. 7, the track 30 includes a rear surface 31 and a front surface 32, while the follower 25 includes surfaces 26 and 27 which face the surfaces 31,32 on the track 30. During normal operation of the restraint, the surfaces 26 and 27 are desired to, and tend to remain spaced from the surfaces 31, 32. For a pull away, however, the outward force exerted by the ICC bar B on the head 22 tends to move the entire restraining member 20, and the follower 25 in an outward direction. As the camming action referred to above occurs, the head 22 of the restraining member tends to be moved downward. As a result, and as seen most clearly in FIG. 9, this causes portions of the surfaces 26 and 27 to frictionally engage the surfaces 31 and 32, respectively. As a result, the restraining member 20 tends to become canted, with the head end 22 moving downward under the camming forces exerted thereon by the ICC bar, and the first end adjacent the follower tending to, at least temporarily, maintain its vertical distance above the driveway. This canted orientation causes a second camming action to occur between the canted tip of the head 22 and the vertical front surface S. Continued movement of the ICC bar B away from the dock face thus causes an additional downward force to be exerted on restraining member 20. We also believe that this secondary camming action may be exacerbated by a slanting of the ICC bar such that its upper surface moves further away from the dock than its lower surface, as seen in phantom in FIG. 9. This slanting is caused by a yielding of the vertical uprights to which the ICC bar is attached (labeled "U" in FIG. 1). As a dockward force is exerted by the restraint on the ICC bar during pull away, these uprights may yield backward (toward the dock), causing the normally squared ICC bar to slant as in FIG. 9 phantom. This enhances the secondary camming effect. Eventually (actually in a matter of milliseconds) the downward forces exerted on the restraining member by at least one of the two camming actions overcome the frictional force between the follower 25 and the track 30, and the entire restraining member moves downward. As a matter of fact, in the Star-style restraint failures we have observed, the head end of the restraining member is first canted downward by the departing ICC bar B, and then the entire restraining member is thrown toward the lowest point of its range of travel, thus leaving the ICC bar B totally unimpeded and able to continue away from the dock face.

We have determined that the Star-style restraint can be improved by modifying the design of the head such that one or both of the camming actions referred to above, and which force the restraining member down, are either eliminated or counteracted. Several embodiments of improved heads for the Star-style restraint and which may also (although not necessarily) be applicable to other types of restraints, are depicted in FIGS. 10–17. The improved head 122 in FIG. 10 includes a pair of parallel lateral surfaces 123 and 124 which are distinct from the inner surface 122a (shown in FIG. 11) and which are disposed about a vertical centerline (CL) of the head 122, the centerline being in a plane parallel to the dock face. Since the lateral surfaces 123, 124 are vertical, a pulling away ICC bar will not be able to cam up and around the curved upper surface of the head 122 during a pull away. Rather, one or both of the portions 50, 51 of the ICC bar disposed laterally of the head 122, and which wrap there around, will catch on the vertical surfaces, thereby maintaining the restraining member to which the head 122 is attached in a restraining position with respect to the ICC bar B. This effect could be enhanced by making the lateral surfaces 123, 124 concave, as depicted in broken lines in FIG. 10. This effect could also be enhanced by roughening the lateral surfaces 123, 124 to increase the frictional engagement between those surfaces and the lateral portions 50, 51 of a wrapping around ICC bar. An exemplary embodiment of such roughening for surfaces 123, 124 is shown in FIG. 11, in which the surfaces are toothed. It will be appreciated that the lateral surfaces 123, 124 will not always be vertical as in FIG. 11 given that the head of the Star-style unit sweeps through a minimally curvilinear path as it moves to the engaging position. Even so, the surfaces are vertical in the head position of FIG. 10. Movement of the head 122 to a different restraining position would cause one of the lateral surfaces to diverge upwardly and outwardly from a vertical line in a plane parallel to the dock face, as will be addressed in the embodiment of FIGS. 12, 13 and 15.

Another improved head 222 is shown in FIG. 12. Instead of having parallel lateral surfaces as in the previous embodiments, this embodiment includes at least one surface disposed laterally of a centerline CL and forming an acute angle therewith. Indeed, this embodiment includes a pair of lateral surfaces 223, 224 distinct from first/inner surface 222a (shown in FIG. 13) and disposed in an upwardly-diverging relation relative to the centerline. Because of the upwardly-diverging relation of the surfaces 223, 224, a departing ICC bar wherein lateral portions 50, 51 wrap around the head 222 would actually exert a camming action on the head 222 tending to move it (and thus the restraining member to which the head 222 is attached) upward into tighter engagement with the ICC bar B, thus preventing the pull away. This effect could also be enhanced by making the lateral surfaces 223, 224 concave, as is depicted in broken lines in FIG. 12. In addition, the lateral surfaces could be roughened to increase the frictional engagement between the lateral surfaces 223, 224 and the lateral portions 50, 51 of the ICC bar B as they wrap around the head 222 during a pull away. An exemplary embodiment of such roughening for surfaces 223, 224 is shown in FIG. 13, in which the surfaces are toothed. Again, the slightly curvilinear motion of the head portion 122, 222 would cause the lateral surfaces 223, 224, as well as surfaces 123, 124 (FIGS. 10 and 11) to take on slightly different orientations in addition to those shown in FIGS. 10 and 13 if ICC bars of different heights above the driveway are used. The overall effect of the surfaces preventing downward movement of the hook for wraparound resulting from pull away would be the same.

This same concept is also applicable to a head having a rounded upper surface as in a Star-style restraint, and as shown in FIG. 15. The head 322 in FIG. 15 also includes a pair of lateral surfaces 323, 324 disposed in an upwardly-diverging relation. Head 322 also includes a rounded top surface 325 that is continuous with the lateral surfaces 323, 324. The rounded top surface of the head 322 includes a centerpoint C and radius R. So long as the head 322 has a total height such that the centerpoint C is always above the horizontal centerline CL of the ICC bar B, any downward camming action exerted on the head 332 by the curved upper surface 325 will be counteracted by an upward camming action exerted on the head 322 by the lateral surfaces 323, 324 as described above.

According to an alternative embodiment, the head of the Star-style restraint may be improved by providing a projection on the head that extends toward the dock face, and which either traps or engages the ICC bar B to prevent downward movement of the restraining member relative to the ICC bar. One example of such a projection is seen in FIG. 14, in which an improved head 422 includes a projection toward the dock face in that at least a portion of the inner surface 440 of the head portion forms an acute angle with the shank 421 of the restraining member. For a pull away by the ICC bar B, the bar B would get pulled under the projection 440, thus preventing the ICC bar B from camming upward on the outer, lateral surfaces of the head 422. Preferably, this angling of the head would be used in combination with the head design shown in FIGS. 10–13. Further, it is desirable for the head 422 to have an overall height greater than the height of the ICC bar.

Alternatively, a projection like that shown in FIGS. 16 and 17 could be used. As seen in those figures, the head 522 is modified to include a projection 540 toward the dock face, and extending from first/inner surface 522a (seen in FIG. 16). The projection 540 is preferably spaced from the shank 521 by a distance greater than the height of the ICC bar B. Accordingly, as the bar B attempts to pull away, it will be trapped beneath the projection 540, thus causing the projection to catch on the ICC bar B if the restraining member 20 is forced downward. The view of FIG. 16 shows the ICC bar already moved away from the dock during a pull away. During normal operation, the ICC bar will typically be disposed closer to the dock face, and not under the projection 540. The section view of FIG. 17 shows the profile of the projection 540. In this embodiment, it includes two angled surfaces 541, 542. The surfaces are angled to take into account the slight rotation of the head 522 as the restraining member traces its slightly curvilinear path of movement, while continuing to maintain proper spacing for ICC bar clearance during normal operation.

A related improvement to the Star-style restraint would be to add an attachable member to the restraining member which provides the projection of the previous embodiments. Such an attachable member is shown in FIGS. 18–20. The attachable member 80 would be attached to a conventional Star-style restraint 10, as in FIG. 18. Preferably, and as seen more clearly in FIG. 19, the attachable member is adapted to be disposed about the shank 21 of the restraining member 25. The member 80 includes a projection 81 with a surface 81a. The projection extends toward the dock from first/inner surface 122a and is formed as a part of member 80 which performs a similar function to the projections described above. Preferably, the attachable member 80 would be freely rotatable about the shank 21, and would include a counterweight 82 at the end opposite the projection 81. The counterweight ensures that the projection 81 of the attachable member always maintains a vertical orientation for all positions of the restraining member to maintain proper spacing for ICC bar clearance during normal operation, without the need for the angled surfaces like 541, 542 shown in FIG. 17. To make the attachable member retrofittable to existing Star-style units, it could be formed of two pieces 85, 86, and be joined together by bolts 87 once in place on the shank 21.

It should be noted that the improvements related to the head portion of the Star-style restraint are not limited to that specific restraint. Rather, they may also generally applicable to other restraining members that include a shank portion and a barrier portion operatively coupled thereto, the restraining member being disposed substantially horizontally and the barrier portion being disposed substantially vertically when the restraining member is in the operative position. The term "operatively coupled" in regard to the shank and the barrier is intended to describe not only restraining members in which the barrier is fixed to the shank as in the Star-style unit, but also to other embodiments, such as where the barrier is capable of reciprocating between a position wherein it extends above the shank to form a restraining member, and a position wherein it is stored below or even inside a horizontally-extending surface forming the "shank". In such restraints with a vertical barrier, the ICC bar may also have a tendency to wrap around the barrier portion for a pull away. The structures of angled lateral surfaces and/or projections from the barrier portion toward the dock face to prevent downward movement of the restraining member for pull away may thus both be applicable to this broader category of restraints. However, it is also true that such restraints may already incorporate features that prevent or minimize uncontrolled separation, thus minimizing or eliminating the advantage of using the present invention. In addition, design aspects of such restraints may make incorporation of the present invention impracticable, particularly in light of the wide variety of trailer and ICC bar configurations.

Returning to the Star-style restraint, an alternative solution to modifying the head to prevent downward forces being exerted on the restraining member is to lock the restraining member in its vertical position above the driveway for a pull away. As will be appreciated by one of skill in the art, however, it is undesirable to lock the restraining member in such a vertical position at all times when the ICC bar is restrained during normal operation, since this does not provide for float of the restraining member with the vehicle as it is loaded and unloaded. FIGS. 21–27 depict two embodiments of improvements to the Star-style restraint that provides free floating of the restraining member for normal operation of the restraint, but that also locks the restraining member in a vertical position for a pull away.

Figure 22:
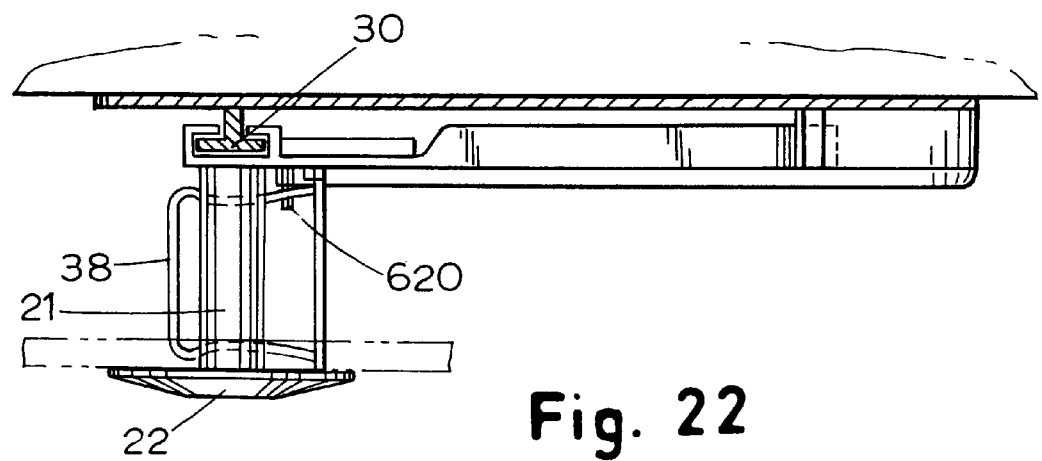
FIG. 22 is a top plan view of the prior art restraint, and the improvement of the locking member of FIG. 21.
Figure 23:
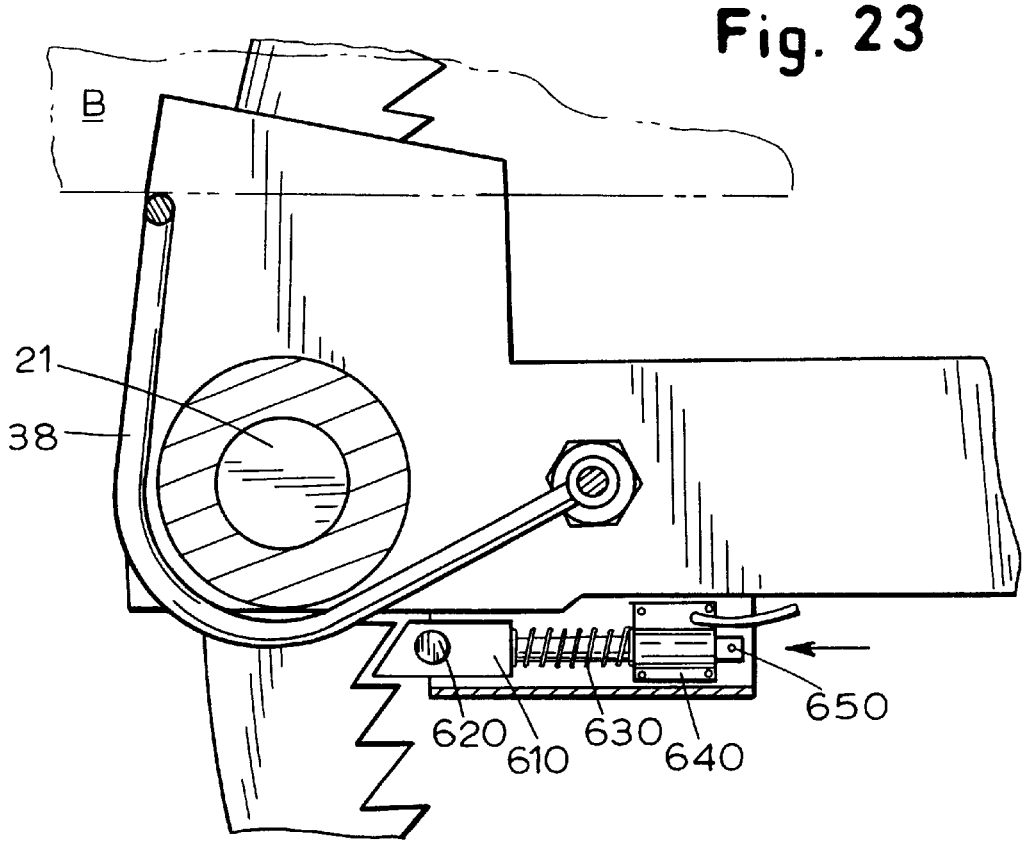
FIG. 23 is a section view of the improved restraint of FIG. 21 with the locking device of the invention engaged.
Figure 24:
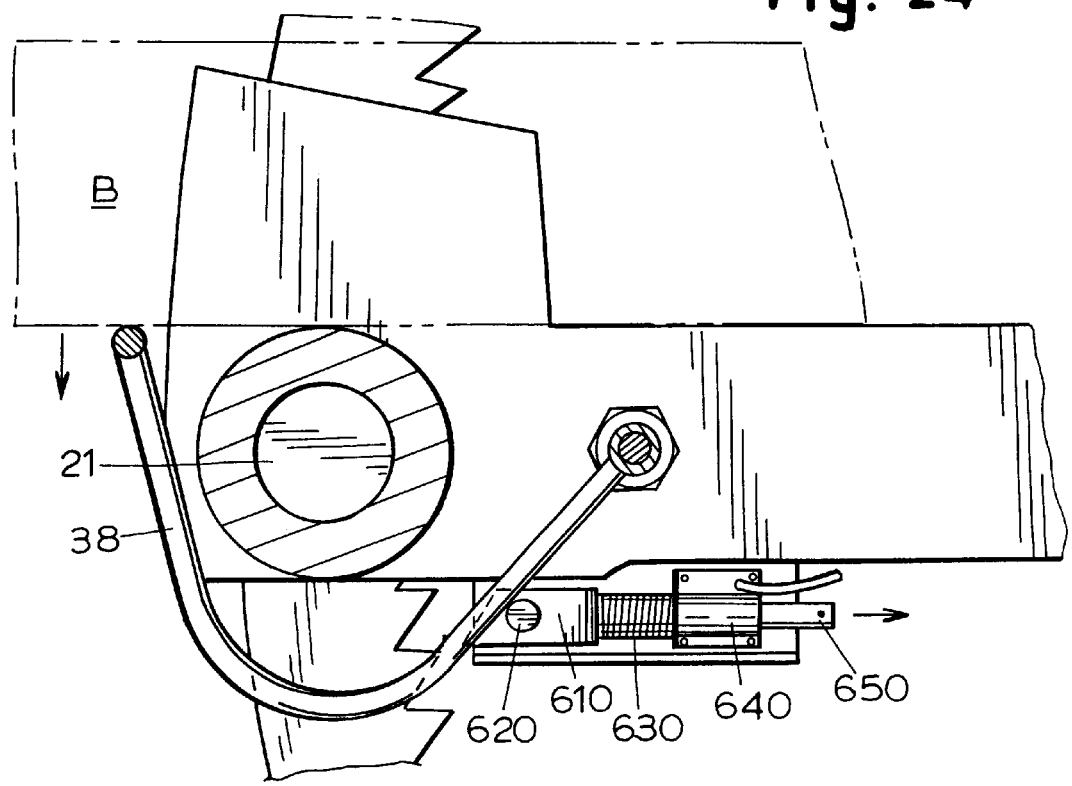
FIG. 24 is a section view of the improved restraint of FIG. 21 with the locking device disengaged.

In the embodiment shown in FIGS. 21–24 a locking device in the form of toothed projections 600 formed in the track 30, and a pawl member 610 (see FIGS. 23 and 24), prevents downward movement of the ICC bar for a pull away, but also provides for "floating" operation of the restraining member for normal conditions. The toothed projections 600 could also be a separate piece or pieces attached adjacent the track 30. As seen in FIGS. 23 and 24, the pawl 610 is preferably carried adjacent the restraining member—in this case on the actuating arm 40 associated with the restraining member 20—and is capable of reciprocating movement between a position wherein the pawl 610 is engaged with a toothed projection 600 on the track 30 (FIG. 23), and a position wherein it is disengaged from a toothed projection 600 (FIG. 24). In the engaged position, the pawl 610 prevents the restraining member from moving downward relative to the track 30. In the disengaged position, the restraining member 20 is permitted to move through its full range of motion.

To allow the improved Star-style device shown in FIGS. 21–24 to only lock the restraining member in its vertical position for a pull away, yet provide for "floating" operation at other times, some means for determining when a pull away is occurring should be coupled to the locking device so that it is activated only when a pull away is occurring. Toward that end, the conventional Star-style unit includes a sensor member 38 that is pivotally mounted about the restraining member 20. As seen most clearly in FIGS. 23 and 24, the sensor member 38 moves between a first position (FIG. 23) and a sensing position (FIG. 24) in response to the restraining member 20 moving upward into engagement with the ICC bar (the ICC bar pushes the sensor member 38 to the sensing position). The pawl 610 is operatively connected to the sensor member 38 such that it is in the disengaged position when the sensor member is in the sensing position (i.e. when an ICC bar B is properly restrained). For a pull away, however, and as described in detail above, the restraining member and the ICC bar move vertically relative to each other, with the restraining member moving down. The pawl is thus also operatively connected to the sensor member 38 such that the pawl 610 moves to the engaged position as the sensor member 38 moves away from the sensing position. Thus, as a pull away occurs, forcing the restraining member down, the ICC moves out of contact with the shank portion 21 of the restraining member 20, and the sensing member 38 moves away from the sensing position, thus engaging the pawl 610 with a toothed projection 600, and locking the restraining member 20 in place vertically above the driveway, thus preventing the ICC bar B from being able to force the restraining member 20 further down and escape therefrom. The toothed projections 600 are depicted as preventing downward movement of the restraining member 20, but allowing upward movement when the pawl 610 is engaged in one of the toothed projections. It will be appreciated that other configurations for both the toothed projections 600 and the pawl 610 could be used, including a configuration that would prevent both downward and upward movement of the restraining member 20 for engagement between the toothed projections 600 and the pawl 610.

In this embodiment, the operative connection between the pawl 610 and the sensor member is in the form of a pin 620 projecting from the pawl 610, and perhaps seen most clearly in the top view of FIG. 22. The pin 620 is disposed so as to be engaged by the sensor member 38 as it moves toward the sensing position, thus pushing the pawl 610 away from an engaged position. The pawl is preferably biased toward the engaged position, in this case by means of a spring 630 disposed between the pawl 610 and a fixed structure mounted adjacent the spring. In addition to the sensor member 38 itself, a second bias-overcoming member is preferably provided, in this case in the form of a solenoid 640 which may be energized to move the pawl 610 away from its engaged position by pulling on a shaft 650 attached thereto. Without the solenoid 640, the restraining member 20 would not be able to move to a stored position after loading or unloading of the vehicle was completed since as soon as contact between the shank 21 and the ICC bar was lost (as is desired in this situation, since the vehicle desires to leave), the restraining member 20 would be locked in position vertically and prevent vehicle departure. Preferably, operation of the solenoid 640 or other bias-overcoming means is tied into the control box for the device such that the solenoid is actuated at least when the button to release the restraint is pushed.

It should be noted that this improvement to the Star-style device is not limited to that specific restraint. Rather, the invention is also broadly directed to a more general vehicle restraint that includes a restraining member and a sensor member operatively coupled to the restraining member for moving to a sensing position in response to movement of the restraining member to a restraining engagement of an ICC bar. A locking mechanism is also provided that is responsive to movement of the sensor member away from the sensing position to lock the restraining member against at least downward movement. Such a locking device is not limited to the mechanical locking device shown in relation to the Star-style restraint. For example, in a restraint device that is biased upwardly by a conventional wire-formed spring, a gas spring, a hydraulic cylinder, or other biasing means, a lock device could be provided to lock the spring or cylinder for movement of the sensor member away from the sensing position. The operative connection between the sensor member and the locking device could be electrical or mechanical. Other alternative means for locking a restraining member against downward movement in response to the sensor member moving away from the sensing position will occur to one of skill in the art. As in the improved Star-style restraint, such structure provides the restraining member with "floating" operation for normal conditions, yet also prevents further downward movement of the restraining member when relative vertical motion between the ICC bar and the restraining member allows the sensor member to move away from the sensing position. Again, however, not all restraints require such a locking mechanism to effectively and safely restrain a vehicle. Nor are all restraints practicably amenable to such modification.

An alternative improvement to the Star-style restraint, and which also allows for "floating" operation of the restraint until a pull away, is shown in FIGS. 25–27. This improvement takes advantage of the canting of the restraining member that we have observed and which was discussed in regard to FIGS. 7–9. As stated there, the canting of the restraining member 20 causes the faces 26 and 27 of the follower 25 to engage the faces 31, 32 of the track 30. According to this embodiment of the invention, the frictional engagement between these surfaces in enhanced by providing a projection 670 on one or both of the surfaces 26, 27 that bites into one of the faces of the track 30. FIG. 26 shows such a biting member 670 disposed in face 27 to bitingly engage the front surface 32 of the track 30 when the restraining member is canted. A detailed view of the biting member 670 is shown in FIG. 27, which shows that the member 670 is threadingly received in a bore or other receptacle formed in the surface and may illustratively include sharp surfaces 671, 672 to enhance the biting action. At the same time, the biting member 670 is disposed such that it does not engage the track 30 during normal operation of the restraint, as is shown in FIG. 25. It is only when a pull away cants the restraining member 20 that the biting member engages the track to lock the restraining member 20 in its vertical position, thus preventing further downward movement and ensuring that the ICC bar B stays captured thereby.

There have thus been disclosed improvements to the Star-style restraint, as well as novel vehicle restraints or components using similar concepts. The resulting devices exhibit enhanced ability to restrain a vehicle's ICC bar during a pull away.

What is claimed is:

1. A restraining member for a vehicle restraint, the vehicle restraint being adapted to be mounted adjacent a face of a loading dock for selectively restraining the ICC bar of a vehicle parked adjacent the dock face to prevent the ICC bar and thus the vehicle from moving away from the dock face, the restraining member being adapted for substantially vertical movement relative to the dock face to a position wherein the restraining member restrainingly engages an ICC bar of a parked vehicle, the restraining member comprising:

a shank portion and a barrier portion operatively coupled to the shank portion, the shank portion being disposed substantially horizontally and the barrier portion being disposed substantially vertically with the restraining member in a restraining position such that the barrier portion prevents the restrained ICC bar from moving away from the dock face and causes at least one of the portions of the ICC bar extending laterally beyond the barrier portion to wrap around the barrier portion when the parked vehicle moves away from the dock face with a force above a predetermined magnitude, the barrier portion including a centerline in a vertical plane generally parallel to the dock face, the barrier portion including at least one lateral surface forming an acute outward angle with the centerline, whereby a lateral portion of the ICC bar engages the angled lateral surface as it wraps around the barrier portion during movement of the vehicle away from the dock face to thereby prevent downward movement of the restraining member.

2. The restraining member of claim 1, wherein the lateral surface is spaced from the centerline.

3. The restraining member of claim 1, wherein the lateral surface is roughened to enhance the frictional engagement with the lateral portion of the ICC bar as it wraps around the barrier portion during movement of the vehicle away from the dock face.

4. The restraining member of claim 3, wherein the roughened lateral surface is toothed.

5. The restraining member of claim 1, wherein the lateral surface is concave.

6. The restraining member of claim 1, wherein the barrier portion includes a pair of lateral surfaces disposed in an upwardly-diverging relation relative to the centerline.

7. The restraining member of claim 6, wherein the lateral surfaces are roughened to enhance the frictional engagement with the lateral portions of the ICC bar as they wrap around the barrier portion during movement of the vehicle away from the dock face.

8. The restraining member of claim 7, wherein the roughened lateral surfaces are toothed.

9. The restraining member of claim 6, wherein the lateral surfaces are concave.

10. An improvement for a vehicle restraint adapted to be mounted adjacent a face of a loading dock for selectively restraining the ICC bar of a vehicle parked adjacent the loading dock to prevent the ICC bar and thus the vehicle from moving away from the dock face, and including a restraining member extending away from the dock face and capable of substantially vertical movement relative to the dock face to a position wherein the restraining member restrainingly engages an ICC bar of a parked vehicle, the restraining member including a shank portion and a head portion connected to the shank, the head portion being disposed substantially parallel to the dock face for preventing the restrained ICC bar from moving away from the dock face and for causing at least one of the portions of the ICC bar extending laterally beyond the head portion to wrap around the head portion when the parked vehicle moves away from the dock face, with the restraining member in the restraining position, with a force above a predetermined magnitude, the improvement comprising:

the head portion including a centerline in a vertical plane generally parallel to the dock face, and including at least one lateral surface forming an acute outward angle with the centerline, and disposed to engage a laterally-extending portion of the ICC bar as a laterally extending portion wraps around the head portion during movement of the vehicle away from the dock face to thereby prevent downward movement of the restraining member.

11. The improvement of claim 10, wherein the lateral surface is roughened to enhance the frictional engagement with a lateral portion of the ICC bar as it wraps around the head portion during movement of the vehicle away from the dock face.

12. The improvement of claim 11, wherein the roughened lateral surface is toothed.

13. The improvement of claim 10, wherein the lateral surface is concave.

14. The improvement of claim 10, wherein the head portion includes a pair of lateral surfaces disposed in an upwardly-diverging relation relative to the centerline.

15. The improvement of claim 14, wherein the lateral surfaces are roughened to enhance the frictional engagement with the lateral portions of the ICC bar as they wrap around the head portion during movement of the vehicle away from the dock face.

16. The improvement of claim 15, wherein the roughened lateral surfaces are toothed.

17. The improvement of claim 14, wherein the lateral surfaces are concave.

18. The improvement of claim 14, wherein the ICC bar includes a horizontal centerline, and wherein the head portion includes a rounded top surface continuous with and above the lateral surfaces, the rounded top surface having a radius and a centerpoint, and wherein the head portion has a total height such that the centerpoint is disposed above the horizontal centerline of the ICC bar when the restraining member is in the restraining position.

19. A restraining member for a vehicle restraint, the vehicle restraint being adapted to be mounted adjacent a face of a loading dock for selectively restraining the ICC bar of a vehicle parked adjacent the dock face to prevent the ICC bar and thus the vehicle from moving away from the dock face, the restraining member being adapted for substantially vertical movement relative to the dock face to a position wherein the restraining member restrainingly engages an ICC bar of a parked vehicle, the restraining member comprising:

a shank portion and a barrier portion operatively coupled to the shank portion, the shank portion being disposed substantially horizontally with the restraining member in a restraining position and the barrier portion extending upwardly from the shank portion and including a first, inner face and being disposed substantially vertically with the restraining member in a restraining position such that the barrier portion prevents a restrained ICC bar from moving away from the dock face and causes at least one of the portions of a restrained ICC bar extending laterally beyond the barrier portion to wrap around the barrier portion when a parked vehicle moves away from the dock face with a force above a predetermined magnitude, the barrier portion including a surface distinct from the first surface and engageable with the ICC bar during movement of the vehicle away from the dock face to thereby prevent downward movement of the restraining member.

20. The restraining member of claim 19, wherein the barrier portion includes a centerline in a vertical plane generally parallel to the dock face, and wherein the distinct surface engageable with the ICC bar is a lateral surface forming an acute outward angle with the centerline, whereby a lateral portion of the ICC bar engages the angled lateral surface as it wraps around the barrier portion during movement of the vehicle away from the dock face to thereby prevent downward movement of the restraining member.

21. The restraining member of claim 20, wherein the angled lateral surface is spaced from the centerline.

22. The restraining member of claim 20, wherein the angled lateral surface is roughened to enhance the frictional engagement with the lateral portion of the ICC bar as it wraps around the barrier portion during movement of the vehicle away from the dock face.

23. The restraining member of claim 22, wherein the roughened lateral surface is toothed.

24. The restraining member of claim 20, wherein the angled lateral surface is concave.

25. The restraining member of claim 19, wherein the barrier portion includes a centerline in a vertical plane generally parallel to the dock face, and wherein the barrier portion includes a pair of lateral surfaces forming the distinct surface and disposed in an upwardly-diverging relation relative to the centerline, whereby a lateral portion of the ICC bar engages at least one of said lateral surfaces as it wraps around the barrier portion during movement of the vehicle away from the dock face to thereby prevent downward movement of the restraining member.

26. The improvement of claim 25, wherein the ICC bar includes a horizontal centerline, and wherein the barrier portion includes a rounded top surface continuous with and above the angled lateral surfaces, the rounded top surface having a radius and a centerpoint, and wherein the barrier portion has a total height such that the centerpoint is disposed above the horizontal centerline of the ICC bar when the restraining member is in the restraining position.

27. The restraining member of claim 19, wherein the surface of the barrier portion that is engageable with the ICC bar is formed on a projection toward the dock face disposed to be engageable with the ICC bar during said pull away by the vehicle to prevent downward movement of the restraining member.

28. The restraining member of claim 27, wherein the projection extends toward the dock face from the inner face of the barrier portion in spaced relation to the shank portion of the restraining member.

29. The restraining member of claim 28, wherein the spacing between the projection and the shank portion is greater than the height of the ICC bar.

30. The restraining member of claim 27, and including an attachable member adapted to be disposed about the shank portion of the restraining member adjacent the barrier portion, the projection forming a part of the attachable member.

31. The improvement of claim 30, wherein the attachable member is capable of rotation about the shank portion.

32. The improvement of claim 31, wherein the attachable member includes first and second opposed ends, and wherein the attachable member freely rotates about the shank portion, the projection being disposed adjacent the first end, the attachable member including a counterweight disposed adjacent the second end for maintaining the attachable member in a vertical orientation for all positions of the restraining member.

33. The improvement of claim 27, wherein the shank portion includes a top surface that is disposed substantially horizontal with the restraining member in the restraining position, at least a portion of the inner face of the barrier portion forming an acute angle with the shank portion top surface to provide the projection.

34. The restraining member of claim 19, wherein the barrier portion includes a curved upper surface and a vertical centerline disposed in a plane substantially parallel to the dock face, and wherein the surface engageable with the ICC bar is disposed laterally of and parallel to the centerline and disposed to be engageable with a laterally-extending portion of the ICC bar as the laterally extending portion wraps around the barrier portion during movement of the vehicle away from the dock face to prevent downward movement of the restraining member.

35. The restraining member of claim 19, wherein the barrier portion includes a curved upper surface and a vertical centerline in a plane generally parallel to the dock face, and wherein the barrier portion includes a pair of lateral surfaces forming the distinct surface and disposed in a parallel relation about the centerline, whereby a lateral portion of the ICC bar engages at least one of said lateral surfaces as it wraps around the barrier during movement of the vehicle away from the dock face to prevent downward movement of the restraining member.

36. The restraining member of claim 35, wherein the lateral surfaces are roughened to enhance the frictional engagement with the lateral portions of the ICC bar as they wrap around the barrier portion during movement of the vehicle away from the dock face.

37. The improvement of claim 36, wherein the roughened lateral surfaces are toothed.

* * * * *